C. E. THOMPSON.
METHOD OF ELECTRIC WELDING.
APPLICATION FILED JUNE 11, 1907.

910,434.

Patented Jan. 19, 1909.

Witnesses:
E. R. Rodd.
Jno. F. Oberlin

Inventor:
Charles E. Thompson
by J. B. Fay
his attorney.

UNITED STATES PATENT OFFICE.

CHARLES E. THOMPSON, OF CLEVELAND, OHIO, ASSIGNOR, BY MESNE ASSIGNMENTS, TO THE ELECTRIC WELDING PRODUCTS COMPANY, OF CLEVELAND, OHIO, A CORPORATION OF OHIO.

METHOD OF ELECTRIC WELDING.

No. 910,434.    Specification of Letters Patent.    Patented Jan. 19, 1909.

Application filed June 11, 1907. Serial No. 378,437.

*To all whom it may concern:*

Be it known that I, CHARLES E. THOMPSON, a citizen of the United States, resident of Cleveland, county of Cuyahoga, State of Ohio, have invented a new and useful Improvement in Methods of Electric Welding, of which the following is a specification, the principle of the invention being herein explained and the best mode in which I have contemplated applying that principle, so as to distinguish it from other inventions.

My invention relates to the art of electric welding and has particular regard to the welding together by means of the electric current of parts having diverse degrees of electrical conductivity.

Said invention, in other words, has its object the provision of an improved method whereby parts, composed of metals thus differing, may be readily and effectively joined together.

To the accomplishment of such and related objects, said invention consists of the steps hereinafter fully described and specifically set forth in the claims.

The annexed drawing and the following description set forth in detail certain steps embodying the principle of my invention, the disclosed method, however, being but one of various methods in which the principle of my invention may be employed.

Figure 1:
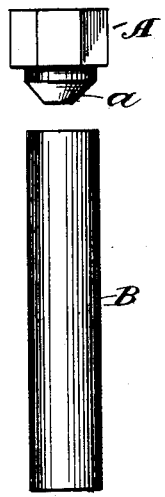
Figure 2:
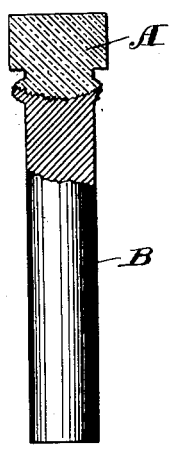
Figure 3:
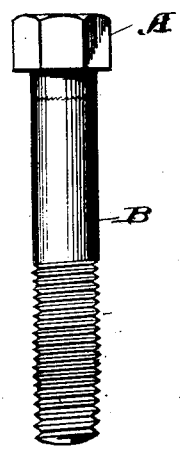

In said annexed drawing: Figure 1 represents in side elevation a brass part and an iron or steel part designed to constitute in their assembled form the head and body, respectively, of a bolt or like object, such parts being shown in a form adapting them for use in connection with my improved method of welding; Fig. 2 is a central longitudinal cross-section of such object upon the completion of the operation of welding; and Fig. 3 is a side elevation of such completed object.

As indicated, for a specific exemplification of the working out of my method I have adopted the making of brass headed bolts or brass cap screws such as have recently found a large field of usefulness, particularly in connection with the manufacture of automobiles and other machinery, where it is desired to employ a fastener of the character of a cap screw that will have a head easily polished without the same time having the fastener of inferior tensile strength as would be the case were the whole screw made of brass.

Now in the welding together of a brass part and a steel part, owing to the higher degree of conductivity possessed by the brass, such conductivity being approximately five times that of steel, the temperature of the former will rise much less rapidly than that of the latter upon the passage through the parts of the heating electric current. Accordingly before the steel reaches its melting point of approximately 2,500 degrees F. the portion of the brass part in contact with the steel part will have become dissipated or burned out since this result takes place at approximately 1,800 degrees F. The method whereby I propose to overcome these several difficulties consists, generally stated, in reducing the cross sectional area of the face of the part having the higher degree of conductivity below the area of the face of the other part, so that the two areas in question are in effect proportioned inversely to the respective conductivities of the said parts. To this end, in the example chosen for illustration, Fig. 1, the brass head A which is designed to be joined to the steel body B, is provided with a welding lug *a* of conical or rather frusto-conical form, the area of its apex bearing the ratio above indicated towards the area of the end of the bolt body B. The welding operation, proper, then consists in bringing the two surfaces in question into contact and keeping them under a steady pressure while at the same time a heating electric current is passed through the parts. The device whereby this operation is accomplished may be various, any of the several well known forms of electric welding apparatus being obviously adaptable to the use in hand. Illustration of such apparatus is accordingly omitted. The flow of current being limited to that which can be accomplished by the reduced contact area of the welding lug, the rise in temperature of the brass head can be controlled and the contiguous end of the bolt body rendered plastic before such head becomes so fluid as to run. The two parts being kept under a steady pressure, the brass closes in as it fuses, consequently increasing the area of contact and correspondingly extending the heated area on the steel end. By the time that the conical portion of the brass has been fused the contact face of the steel is brought to the required temperature to perform the welding operation. The result is hence a firm union of the character clearly brought forth in Fig. 2 of the drawings, representing actual operative conditions, wherein it is seen that the brass welding lug has remained sufficiently cohesive and integral to impress its form upon the meeting end of the steel rod. Furthermore such head is not simply superficially stuck onto the bolt end but as also shown in the figure last of reference, and in Fig. 3, filaments or fringes of the respective materials intertwine or interlock and thus make the unison a dove-tail joint as it were, indicating that such materials are of substantially equal plasticity in spite of their unlike conductivities.

Other modes of applying the principle of my invention may be employed instead of the one explained, change being made as regards the process herein disclosed, provided the step or steps stated by any one of the following claims or the equivalents of such stated step or steps be employed.

I therefore particularly point out and distinctly claim as my invention:—

1. The method of electrically welding together parts of diverse degrees of conductivity, which consists in first reducing the cross-sectional area of the face of the part having the higher degree of conductivity below the area of the face of the other part, maintaining such faces in contact under a steady pressure, and then passing a heating electric current through the same.

2. The method of electrically welding together parts of diverse degrees of conductivity, which consists in first proportioning the cross-section areas of the faces of the parts inversely to the respective conductivities of said parts, maintaining such faces in contact under a steady pressure, and then passing a heating electric current through the same.

3. The method of electrically welding a brass to a steel part, which consists in first reducing the cross-sectional area of the face of the brass part below the area of the face of the steel part, maintaining such faces in contact under a steady pressure, and then passing a heating electric current through the same.

4. The method of electrically welding together a brass to a steel part, which consists in first reducing the cross-sectional area of the face of the brass part to approximately one-fifth that of the steel part, bringing such faces into contact, and then passing a heating electric current through the same.

5. The method of electrically welding onto a body of one degree of conductivity a head having a greater conductivity, which consists in first providing the latter with a welding lug of frusto-conical form, the area of the apex of said lug being proportioned to that of the end of said body inversely to the respective conductivities of said head and body, bringing said lug and body into contact, and then passing a heating electric current through the same.

6. The method of electrically welding a brass head onto a bolt-body of steel, which consists in first providing said head with a welding lug of frusto-conical form, maintaining said lug and body in contact under a steady pressure, and then passing a heating electric current through the same.

7. The method of electrically welding a brass head onto a bolt-body of steel, which consists in first providing said head with a welding lug of frusto-conical form, the area of the apex of such lug being approximately one-fifth that of the end of the bolt body, bringing said lug and body into contact, and then passing a heating electric current through the same.

Signed by me this 24th day of May, 1907.

CHARLES E. THOMPSON.

Attested by—
 E. R. Rodd,
 Jno. F. Oberlin.